United States Patent [19]
Klug et al.

[11] Patent Number: 5,321,335
[45] Date of Patent: Jun. 14, 1994

[54] ALUMINA, CALCIA, YTTRIA SEALING COMPOSITION

[75] Inventors: Frederic J. Klug, Schenectady; Subramaniam Venkataramani, Clifton Park; Kenneth W. Lay, Schenectady, all of N.Y.

[73] Assignee: General Electric Company, Schenectady, N.Y.

[21] Appl. No.: 924,215

[22] Filed: Aug. 3, 1992

[51] Int. Cl.⁵ .................. H01J 17/18; C03C 3/00
[52] U.S. Cl. ............................ 313/623; 313/624; 501/41
[58] Field of Search ............ 313/623, 624; 501/41, 501/15, 21; 174/50.61; 220/2.1 R

[56] References Cited

U.S. PATENT DOCUMENTS

| | | |
|---|---|---|
| 3,448,319 | 6/1969 | Louden ........................ 313/221 |
| 3,469,729 | 9/1969 | Grekila et al. ................. 220/2.3 |
| 3,558,963 | 1/1971 | Hanneman et al. ............ 313/184 |
| 3,588,577 | 6/1971 | McVey et al. ................. 313/317 |
| 3,598,435 | 8/1971 | Jorgensen .................. 287/189.365 |
| 4,056,752 | 11/1977 | Bubar ......................... 313/217 |
| 4,103,200 | 7/1978 | Bhalla ......................... 313/221 |
| 4,199,704 | 4/1980 | Varsheneya et al. ............ 313/221 |
| 4,208,605 | 6/1980 | McVey et al. ................. 313/221 |
| 4,291,250 | 9/1981 | Bhalla ......................... 313/220 |
| 4,326,038 | 4/1982 | Oda et al. ..................... 501/41 |
| 4,435,669 | 3/1984 | Plagge et al. .................. 313/634 |

*Primary Examiner*—Sandra L. O'Shea
*Assistant Examiner*—Nimesh D. Patel
*Attorney, Agent, or Firm*—James Magee, Jr.

[57] ABSTRACT

The invention relates to a sealing composition suitable for bonding yttria or alumina ceramic members, or bonding refractory metals to the ceramics. The sealing composition has, in mole percent, about 0.5 to 40 percent yttria, about 45 to 65 percent alumina, up to 10 mole percent strontia, and the balance substantially calcia.

8 Claims, 3 Drawing Sheets

ALUMINA, CALCIA, YTTRIA SEALING COMPOSITION

This invention relates to a sealing composition suitable for bonding yttria or alumina ceramic members, or bonding refractory metals to the ceramics.

BACKGROUND OF THE INVENTION

Alumina has been used as an envelope material for high intensity alkali metal vapor lamps such as high pressure sodium vapor lamps, because it withstands the attack of the vapors of the alkaline metals even at high temperatures. Yttrium oxide is an excellent candidate material for such high temperature lamp envelopes, and a method of forming transparent or translucent yttria bodies is disclosed in U.S. Pat. No. 4,755,492, incorporated herein by reference. In making such lamps, enclosures which support electrodes in the lamps are bonded and hermetically sealed to the ceramic envelope, for example, by a ceramic sealing composition. The enclosures may take the form of metal end caps which provide direct electrical connection to the electrodes, or ceramic plugs having a metal conductor sealably extending therethrough to provide the electrical connection. Niobium has a coefficient of expansion similar to alumina, and has been used either for the end cap, or the conductor extending through the ceramic plug. U.S. Pat. No. 3,469,729 discloses a sealing composition comprising about 44 to 55 weight percent calcia, about 40 to 55 weight percent alumina, and about 0.5 to 10 weight percent of at least one material selected from the group silica, baria, zirconia, strontia, titania, beryllia, thoria, and yttria. While the conversion from weight percent to mole percent is known, examples of the conversion from weight percent to mole percent of compositions within U.S. Pat. No. 3,469,729 are shown below in Table I.

TABLE I

Conversion of Weight Percent to Mole Percent for Compositions in U.S. Pat. No. 3,469,729

| CaO | | $Al_2O_3$ | | $Y_2O_3$ | |
|---|---|---|---|---|---|
| Weight Percent | Mole Percent | Weight Percent | Mole Percent | Weight Percent | Mole Percent |
| 44 | 61.3 | 46 | 35.3 | 10 | 3.5 |
| 44 | 59.06 | 55 | 40.61 | 1 | 0.33 |
| 46 | 63.3 | 44 | 33.3 | 10 | 3.4 |
| 50 | 67.1 | 40 | 29.5 | 10 | 3.3 |
| 45 | 61 | 50 | 37.3 | 5 | 1.7 |
| 45 | 61.3 | 49 | 36.7 | 6 | 2.0 |
| 55 | 70.3 | 40 | 28.1 | 5 | 1.6 |
| 55 | 69.1 | 44.5 | 30.75 | 0.5 | 0.2 |

One aspect of this invention is to provide a sealing composition suitable for forming seals in high temperature lamps between ceramic members comprised of yttria or alumina, or sealing between refractory metals and the ceramics.

SUMMARY OF THE INVENTION

A sealing composition suitable for bonding ceramics comprised of yttria or alumina is comprised of about 0.5 to 40 mole percent yttria, about 45 to 65 mole percent alumina, and the balance substantially calcia and up to 10 mole percent strontia.

As used herein, the term "balance substantially calcia" means calcia comprises the remaining mole percentage of the compound. However, other elements or compounds which do not interfere with the wetting, bonding, and long life of the sealing composition may be present either as impurities or at non-interfering levels. For example, up to about 2 mole percent of $B_2O_3$ can be added to improve the wetting and flow characteristics of the sealing composition. Impurity amounts of barium, silicon, rare earth's except gadolinium, alkali metal's, and transition metal's, should be less than one mole percent each. Gadolinium forms a solid solution with yttria, and may be present in amounts greater than one mole percent that do not substantially change the thermal expansion of the composition.

DETAILED DESCRIPTION OF THE INVENTION

Figure 1:
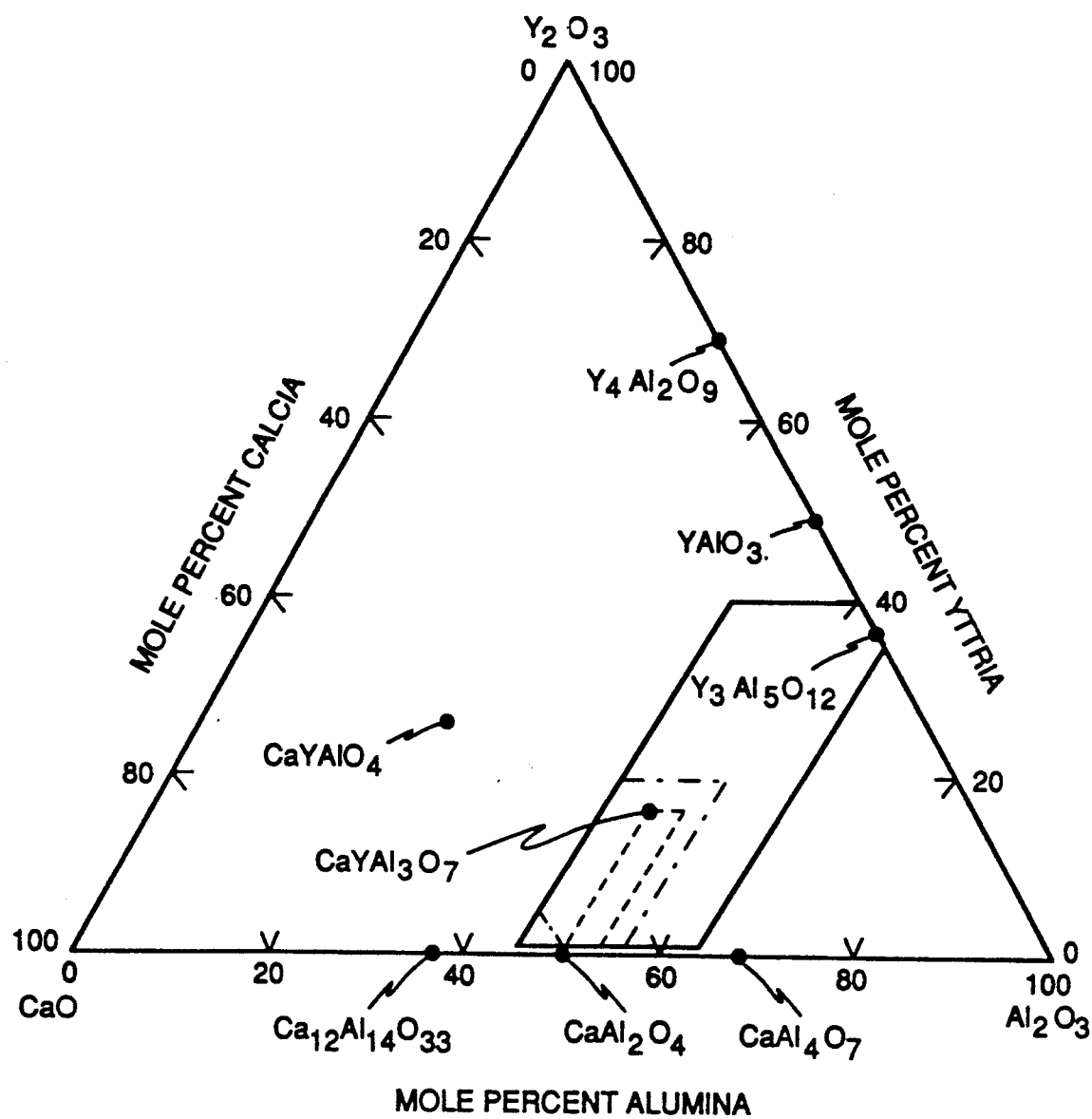
FIG. 1 is a graph showing ceramic compositions in the yttria-calcia-alumina ternary system.

Referring to FIG. 1, the sealing compositions disclosed in U.S. Pat. No. 3,469,729 are less than 41 mole percent alumina, and can be plotted in an area, not shown, within the lower left side of the graph. However, the sealing compositions of this invention, substantially within the area bounded by the solid line plotted on FIG. 1, are in an area on the right side of the graph because the alumina is greater than about 45 mole percent of the composition.

Figure 2:
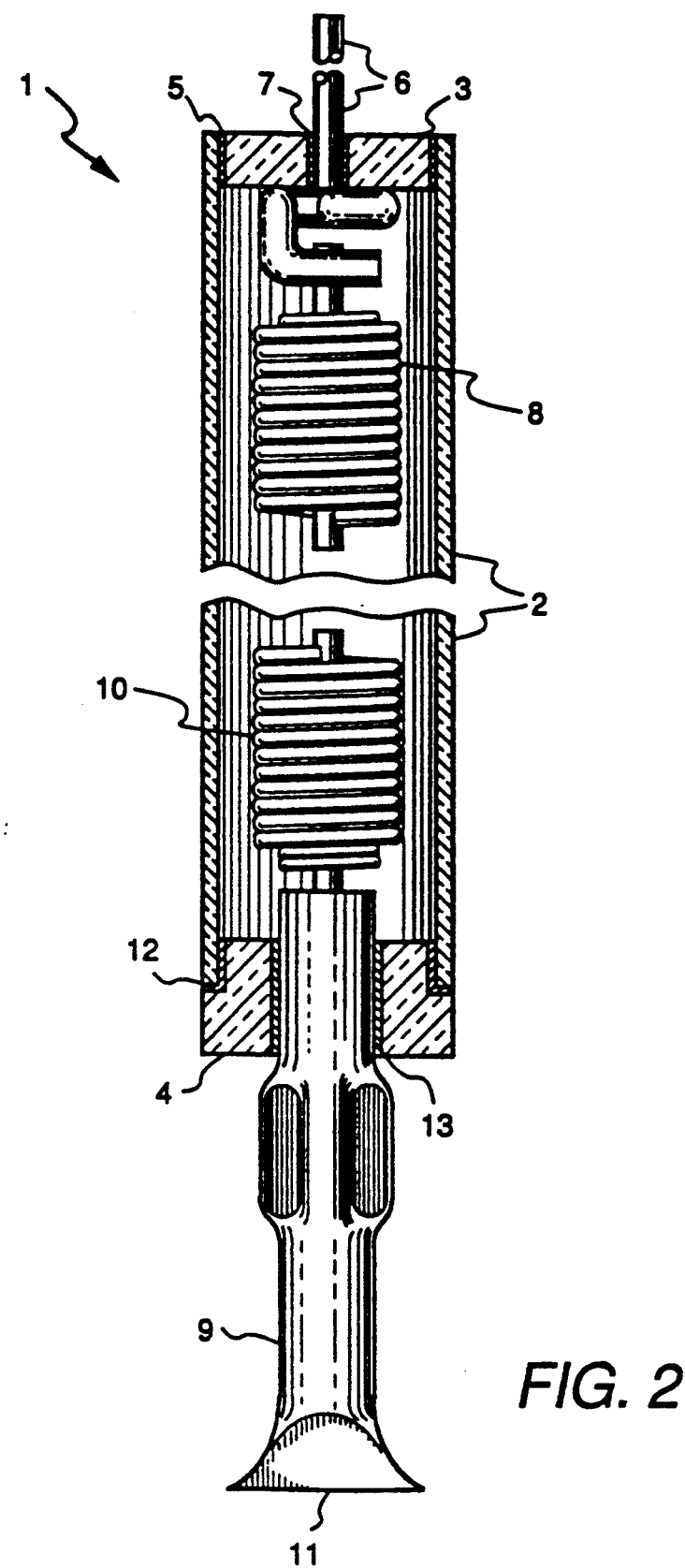
FIG. 2 shows a ceramic arc tube sectioned to reveal the use of the sealing composition of the invention.

An example application of the sealing composition of the invention to seal the arc tube closures for an electric lamp is illustrated in FIG. 2. The arc tube 1 comprises an envelope 2 of ceramic tubing consisting of sintered high density polycrystalline yttria or alumina. A central portion of the tube has been cut out to shorten the figure, and the sectioning reveals the internal construction. By way of example, in a 400-watt size of lamp, the arc tube is about 110 millimeters long by 7.5 millimeters in diameter.

The ends of the tube are closed by yttria or alumina ceramic plugs, a flat disk-like plug 3 at the upper end and a shoulder plug 4 at the lower end. Plug 3 is hermetically sealed into the end of the arc tube by a ring 5 of the sealing composition of this invention. The plug 4 has an axial bore, and a niobium lead wire 6 extends through the bore. The wire 6 is hermetically sealed in the bore by more of the sealing composition indicated at 7. The lead wire 6 supports an upper electrode 8 within the arc tube, and its external portion is used as a connector and a support for the upper end of the arc tube within an outer envelope. Additional information about the envelope plug and lead wire assembly is disclosed in U.S. Pat. No. 3,992,642, incorporated by reference herein.

Shouldered plug 4, at the lower end of envelope 2, has a central aperture through which extends a thin-walled niobium tube 9. The niobium tube 9 serves as an inlead and supports lower electrode 10 within the arc tube. The tube 9 also serves as an exhaust tube for removing air and introducing the filling gas and the sodium and mercury charge during manufacture, after which it is hermetically tipped off at 11. The construction of the lower plug and electrode assembly may be as more fully described in U.S. Pat. No. 4,065,691, incorporated by reference herein. The sealing composition of this invention is used at 12 to hermetically seal lower plug 4 to the envelope 2, and at 13 to seal niobium tube 9 to the plug 4.

The sealing composition of this invention is suitable for bonding yttria ceramic numbers, or members formed from yttria and refractory metals such as niobium, while providing a leak proof seal suitable for high intensity alkali metal vapor lamps. It has also been found that the sealing composition of this invention is suitable for sealing alumina ceramic members, or alumina and refractory metal members. The sealing composition is comprised of, in mole percent, about 0.5 to 40 percent yttria, about 45 to 65 percent alumina, and the balance substantially calcia. The calcia can be replaced with strontia in an amount that does not substantially change the thermal expansion of the composition, i.e., up to about 10 mole percent.

A preferred composition, in mole percent, is about 0.5 to 20 percent yttria, about 45 to 57 percent alumina, and about 23 to 50 percent calcia. A more preferred composition, in mole percent, is about 0.5 to 17 percent yttria, about 50 to 55 percent alumina, and about 33 to 50 percent calcia. Preferably, the sealing composition favors the formation of the compounds $CaYAl_3O_7$, $CaAl_2O_4$, $CaAl_4O_7$, and $Y_3Al_5O_{12}$, and the composition minimizes the formation of the compounds $YAlO_3$, $Y_4Al_2O_9$, $CaYAlO_4$, and $Ca_{12}Al_{14}O_{33}$ preferably to less than 1 mole percent in the seal.

The sealing composition can be formed by methods known to those skilled in the art. For example, appropriate amounts of powders of calcium carbonate, alumina, and yttria are intimately mixed, and calcined at 1250°-1300° C. to decompose the carbonate. The powders preferably have a particle size of about one micron or less. The powder mixture can be mixed with a conventional binder composition for application as a painted slurry, or to tape cast or die press a green tape to position between the members to be sealed. The binder composition can be formed from suitable organic materials that decompose at about 1000° C. or less. The binder should completely decompose so that the sealing composition is substantially free of carbonaceous material prior to melting of the sealing composition to form the seal.

The members with the sealing composition applied therebetween are heated to about 400° to 1000° C. in an atmosphere suitable for removing decomposition products from the binder, such as air, argon, or a vacuum to decompose organics in the binder. The members are further heated in an atmosphere inert to the members and the seal to about 1550° to 1625° C. to melt the sealing composition and form the seal between the members. When a ceramic member is to be sealed to a refractory metal, suitable inert atmospheres include argon, helium, or a vacuum. When only ceramic members are being sealed, suitable inert atmospheres include oxidizing atmospheres such as air. The organics in the binder can be decomposed during slow heating of the members to the melting temperature.

Additional features and advantages of the sealing composition of this invention are shown in the following Examples. In the following Examples a polyvinylbutyral binder composition was used comprised of, in weight percent, about 12.5 percent polyvinylbutyral binder tradename Butvar B76, Monsanto, 10 percent dipenta erythritol plasticizer tradename Plasticizer 2072, PVO International, 1.3 percent di isodecyl glutarate plasticizer tradename Plasthall, C. P. Hall Co., 53.9 percent toluene solvent, 18.3 percent MIBK solvent, and 4 percent ethyl alcohol solvent.

EXAMPLE 1

Powders of calcium carbonate, alumina, and yttria having a particle size of about one micron were mixed in appropriate amounts to form a sealing composition comprised of about 7 mole percent yttria, 42 mole percent calcia, and 51 mole percent alumina. The powders were mixed by vibratory milling with an alumina milling media in methanol. The milling media was separated from the mixture, and the mixture was calcined in air at about 1250°-1300° C. About 32 grams of the powder mixture was mixed with about 18 grams of the polyvinylbutyral binder composition, and 8 grams xylene to form a moldable composition. The moldable composition was tape cast to form a green tape about 0.5 millimeter thick. A disk about 10 millimeters in diameter was cut from the tape and placed between a yttria tube and a yttria disk forming an assembly. The assembly was heated in air to about 1000° C. to decompose the binder, and further heated to 1595° C. to melt the sealing composition. The temperature was held for about 5 minutes to form the seal, and the assembly was slowly cooled to room temperature.

The sealed assembly was tested in a conventional helium leak test. Briefly described, a vacuum was applied to the tube and the exterior of the tube is exposed to an atmosphere containing helium. No helium was detected in the vacuum applied to the tube showing a hermetic seal was formed, and no cracks were formed in the seal. As a result the seal provides a good thermal expansion match with the yttria. The seal was sectioned and inspected with a microprobe and found to be composed primarily of the oxide compounds $Y_3Al_5O_{12}$, $CaYAl_3O_7$, $CaAl_2O_4$, and a small amount of $CaAl_4O_7$ less than about 10 volume percent.

EXAMPLE 2

A sealing composition and seal between a yttria tube and yttria disk was formed as in Example 1, except as noted herein. The sealing composition was comprised of 7 mole percent yttria, 37 mole percent alumina, and 56 mole percent calcia. The assembly was heated in air to about 1420° C. to melt the sealing composition and held for 5 minutes to form the seal. The assembly was helium leak tested, and helium leakage was found indicating the presence of cracks in the seal. The assembly was sectioned and inspected with the microprobe and found to be comprised of the compounds $CaYAlO_4$, $CaAl_2O_4$, and $Ca_{12}Al_{14}O_{33}$.

EXAMPLE 3

A sealing composition and seal was formed as in Example 1 except as noted herein. The sealing composition was comprised of 11 mole percent yttria, 42 mole percent alumina, and 47 mole percent calcia. The assembly was heated in air to about 1420° C. to melt the sealing composition, and held for 5 minutes to form the seal. The assembly was helium leak tested, and helium leakage was found indicating the presence of cracks in the seal.

EXAMPLE 4

Powders of calcium carbonate, yttria, and alumina were mixed in appropriate amounts and heated in air to form a first powder of $CaYAl_3O_7$, and a second powder of $CaYAlO_4$. The first powder is within the composition of this invention, and the second powder is outside the composition of this invention as shown in FIG. 1. The first powder was pressed and sintered at about 1575° C., and the second powder was pressed and sintered at about 1700° C. to form bars about 0.64×0.32×1.9 centimeters. The bars were heated in air to various temperatures, and the thermal expansion of each bar was measured by conventional dilatometry.

Figure 3:
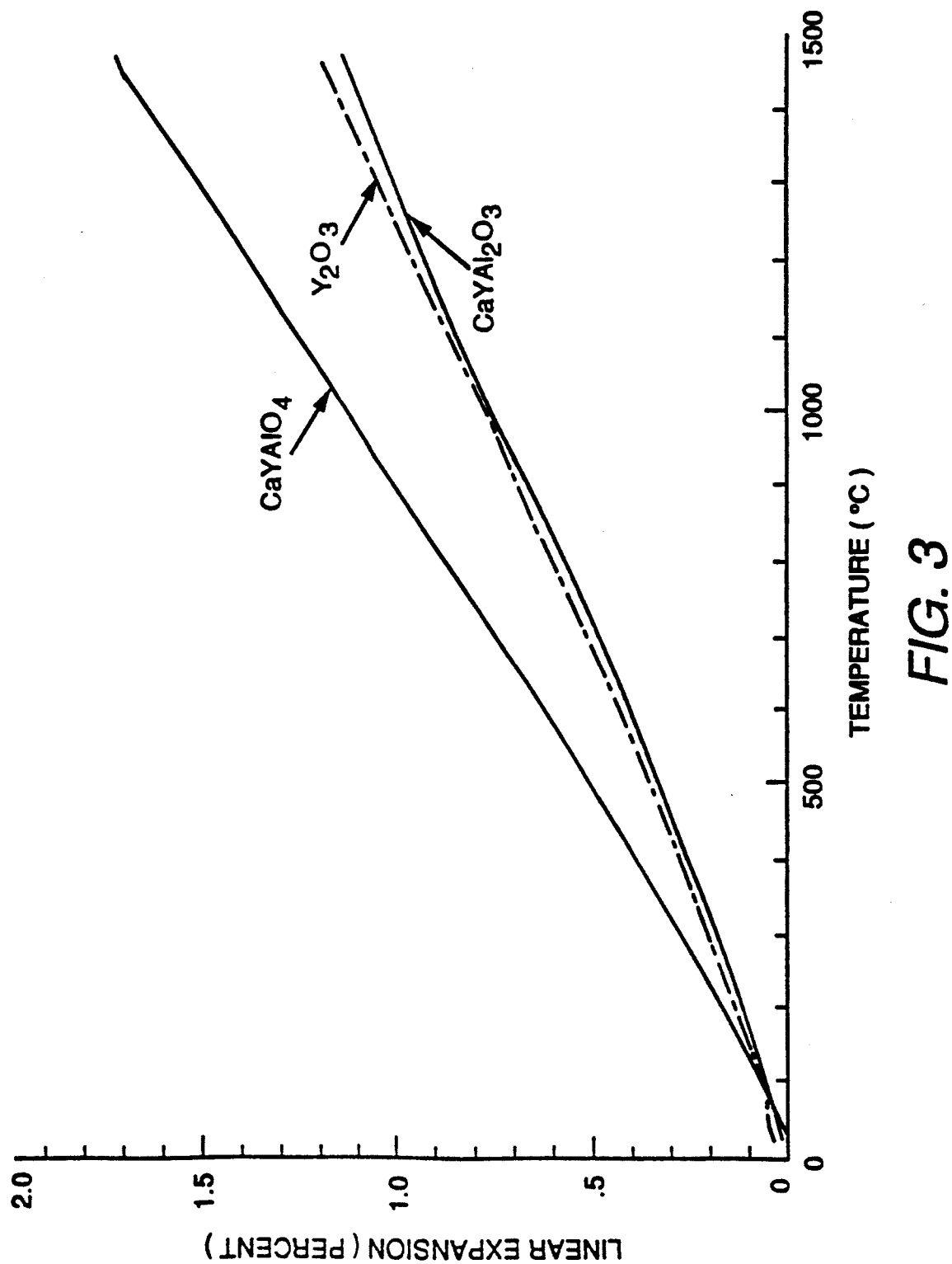
FIG. 3 is a graph showing the thermal expansion of a bar of each of the following compositions; yttria, $CaYAl_3O_7$, and $CaYAlO_4$.

FIG. 3 is a graph showing the linear thermal expansion of the bars, in percent plotted on the ordinate, as a function of temperature, in °C. plotted on the abscissa. From FIG. 3 it can be seen that the bar formed from the first powder, within the composition of this invention, has a thermal expansion very close to yttria. However, the bar formed from the second powder, outside the composition of this invention, has a thermal expansion greater than the thermal expansion of yttria.

What is claimed is:

1. A sealing composition comprising, in mole percent, about 0.5 to 40 percent yttria, about 45 to 65 percent alumina, up to 10 mole percent strontia, and the balance substantially calcia.

2. A sealing composition according to claim 1 wherein yttria is about 0.5 to 20 percent, alumina is about 45 to 57 percent, and calcia is about 23 to 50 percent.

3. A sealing composition according to claim 1 wherein yttria is about 0.5 to 17 percent, alumina is about 50 to 55 percent, and calcia is about 33 to 50 percent.

4. The sealing composition of claim 1 comprising about 7 percent yttria, about 51 percent alumina, and about 42 percent calcia.

5. An article of manufacture comprising a ceramic body having a ceramic or refractory metal bonded thereto by a sealant, the ceramic being alumina or yttria, the sealant being a resolidified melt of a composition comprising, in mole percent, about 0.5 to 40 percent yttria, about 45 to 65 percent alumina, up to 10 mole percent strontia, and the balance substantially calcia.

6. An article of manufacture according to claim 5 wherein yttria is about 0.5 to 20 percent, alumina is about 45 to 57 percent, and calcia is about 23 to 50 percent.

7. An electric lamp comprising an envelope formed of a ceramic tube, the ceramic being alumina or yttria, and having enclosures, a pair of electrodes and a filling of an ionizable medium therein, and a sealant bonding at least one enclosure to said tube, the sealant being a resolidified melt of a composition comprising, in mole percent, about 0.5 to 40 percent yttria, about 45 to 65 percent alumina, up to 10 mole percent strontia, and the balance substantially calcia.

8. An electric lamp according to claim 7 wherein wherein yttria is about 0.5 to 20 percent, alumina is about 45 to 57 percent, and calcia is about 23 to 50 percent.

* * * * *